(12) United States Patent
Coleman et al.

(10) Patent No.: US 8,675,374 B2
(45) Date of Patent: Mar. 18, 2014

(54) AUTO-OPTIMIZATION CIRCUITS AND METHODS FOR CYCLICAL ELECTRONIC SYSTEMS

(75) Inventors: Charles Coleman, Fort Collins, CO (US); Sam Seiichiro Ochi, Saratoga, CA (US); Ernest H. Wittenbreder, Jr., Flagstaff, AZ (US); Yeshoda Yedevelly, San Jose, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 227 days.

(21) Appl. No.: 13/197,596

(22) Filed: Aug. 3, 2011

(65) Prior Publication Data

US 2012/0032728 A1 Feb. 9, 2012

Related U.S. Application Data

(60) Provisional application No. 61/370,444, filed on Aug. 3, 2010.

(51) Int. Cl.
*H02M 3/335* (2006.01)
(52) U.S. Cl.
USPC ..................................... 363/21.03; 363/21.13

(58) Field of Classification Search
USPC ......... 323/235, 319; 363/21.03, 21.05, 21.06, 363/21.08, 21.16, 21.13, 21.14
See application file for complete search history.

(56) References Cited

U.S. PATENT DOCUMENTS 6,671,189 B2 * 12/2003 Jansen et al. ................ 363/21.14
2006/0017538 A1 * 1/2006 Magoon et al. ................ 336/182

* cited by examiner

*Primary Examiner* — Harry Behm
*Assistant Examiner* — Matthew Grubb
(74) *Attorney, Agent, or Firm* — Simon Kahn

(57) ABSTRACT

Methods, systems, and devices are described for an adjustment module that interacts with a parameter detection module to provide a threshold value for initiating switching of a switching module in a cyclical electronic system. Aspects of the present disclosure provide a switching module used in conjunction with an inductor that is coupled with the switching module. The threshold voltage for switching the switching module may be adjusted to provide switching at substantially zero volts while maintaining sufficient energy in the inductor to drive the voltage at a switching element in the switching module to zero volts. Such auto-adjustment circuits may allow for enhanced efficiency in cyclical electronic systems. The output of an up/down counter may be used to set another parameter that effects the performance of the cyclical electronic system in order to enhance the performance of the cyclical electronic system.

13 Claims, 10 Drawing Sheets

… (1) …

AUTO-OPTIMIZATION CIRCUITS AND METHODS FOR CYCLICAL ELECTRONIC SYSTEMS

CROSS REFERENCES

This application claims priority to U.S. Provisional Patent Application No. 61/370,444 entitled "AUTO-OPTIMIZATION CIRCUITS AND METHODS FOR CYCLICAL ELECTRONIC SYSTEMS," filed on Aug. 3, 2010, the entire disclosure of which is incorporated herein by reference for all purposes. This application is also related to: U.S. patent application Ser. No. 13/197,612, filed on even date herewith, entitled "GATE DRIVER POWER AND CONTROL SIGNAL TRANSMISSION CIRCUITS AND METHODS," and U.S. patent application Ser. No. 13/197,621, filed on even date herewith, entitled "SINGLE INDUCTOR POWER CONVERTER SYSTEM AND METHODS," and the entire disclosure of each is incorporated herein by reference for all purposes.

BACKGROUND

The present disclosure is directed to circuits and methods for auto-adjustment of switch timing in cyclical electronic circuits using detection and adjustment circuits.

In electronic circuits, it is often desired to perform switching of an input signal when the voltage of that signal is at or near zero volts. Zero voltage switching is used in some cases to reduce or eliminate transient effects that may result from switching of a signal that is not at zero volts, which may negatively impact the operation of other electronic components in the circuit. For example, in a synchronous rectifier, field effect transistors are commonly used for rectifier elements, and provide efficient operation of the rectifier. In such devices, switching of the transistors at zero volts is important for proper operation of the circuit. In some cases, the cyclical input signal that is being rectified can have variations in the frequency of the cyclical signal, and thus switching according to a preset timing may lead to sub-optimal performance.

Additionally, in some electronic circuits it is also desirable to use energy from an input signal to drive a switch. However, if zero voltage switching is also desired, the energy in the input signal at the time of switching may not be sufficient to drive the switch to zero volts. If the switch in such cases is not properly switched, this can also lead to sub-optimal performance of the electronic circuit.

SUMMARY

In many applications, zero voltage switching in cyclical electronic systems is desired, such as switching of elements in a synchronous rectifier or electronic switch mode power supply. Furthermore, many of these same applications also have a desire to have sufficient energy available to drive a switch element during switching of the switch element, such as driving the drain voltage of a field effect transistor to zero volts. Embodiments described herein provide a new design of auto-adjustment circuits that may allow for switching of switch elements in a cyclical electronic system at or near zero volts while maintaining sufficient energy to drive the switching element. Methods, systems, and devices are described for an adjustment module that interacts with a parameter detection module to provide a threshold value for initiating switching of a switching module in a cyclical electronic system. Aspects of the present disclosure provide a switching module used in conjunction with an inductor that is coupled with the switching module. The threshold voltage for switching the switching module may be adjusted to provide switching at substantially zero volts while maintaining sufficient energy in the inductor to drive the voltage at a switching element in the switching module to zero volts. Such auto-adjustment circuits may allow for enhanced efficiency in cyclical electronic systems.

Therefore, in an embodiment, an auto-adjustment circuit for a cyclical electronic system is provided. The auto-adjustment circuit comprises, a switching module configured to couple a cyclical input signal with a first output; a parameter detection module coupled with the switching module, and configured to detect a parameter related to at least a voltage of the cyclical input signal and an energy available in the cyclical input signal; and an adjustment module coupled with the parameter detection module and switching module, and configured to control the switching of the switching module based on the detected parameter. The parameter detection module may comprise, for example, a voltage detector coupled with the input of the switching module, and an energy detector. In an example, the adjustment module is configured to adjust a threshold voltage for initiating switching of the switching module to decrease the threshold voltage when the voltage detector detects a voltage less than zero volts for a prior switching cycle, and increase the threshold voltage when the energy detector indicates the voltage at a switch element in the switching module was greater than zero volts for a prior switching cycle.

In another embodiment, a method for adjusting switching in a zero voltage switching module of a cyclical electronic system is provided. The method comprises switching a cyclical input signal to a first output when a magnitude of the cyclical input signal drops below a voltage threshold value; detecting a parameter related to at least a voltage of the input signal and an energy available from the input signal when the input signal is switched to the first output; and adjusting the voltage threshold value based on the detected parameter. The step of detecting a parameter may comprise, for example, detecting a voltage of the input signal; and detecting an energy available from the input signal. The voltage threshold value may be adjusted by decreasing the voltage threshold value when the voltage is less than substantially zero volts; and increasing the voltage threshold value when the energy available from the input signal is below an energy threshold. The energy threshold may be set, for example, to a value to provide sufficient energy to drive a drain of a transistor of a switching circuit to zero volts when the cyclical input signal is switched to the first output. In one embodiment, adjusting the voltage threshold value comprises: receiving a voltage of the input signal when the input signal is switched to the first output; decrementing a counter when the received voltage is less than zero volts; receiving an indication of available energy from the input signal when the input signal is switched to the first output; incrementing the counter when the available energy is below an energy threshold; and setting the voltage threshold value based on a current value of the counter.

Such methods, systems, and devices thus provide for efficient adjustment of switching components to provide for switching at or near zero volts while maintaining sufficient energy to drive switching components, such as a drain of a field effect transistor, to zero volts when the switching component is switched.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

Systems, devices, and methods are described for an adjustment module that interacts with a parameter detection module to provide a threshold value for initiating switching of a switching module in a cyclical electronic system. Aspects of the present disclosure provide a switching module used in conjunction with an inductor that is coupled with the switching module. The threshold voltage for switching the switching module may be adjusted to provide switching at substantially zero volts while maintaining sufficient energy in the inductor to drive the voltage at a switching element in the switching module to zero volts. Such auto-adjustment circuits may allow for enhanced efficiency in cyclical electronic systems.

The term "switch" or "switch element," as used herein, refers to an electrical circuit element that may have two electrical states, one of which substantially blocks current flow through the element and the other of which allows current flow through the element substantially unimpeded. Such switches may include, for example, rectifier diodes, transistors, relays, and thyristors.

Figure 1:
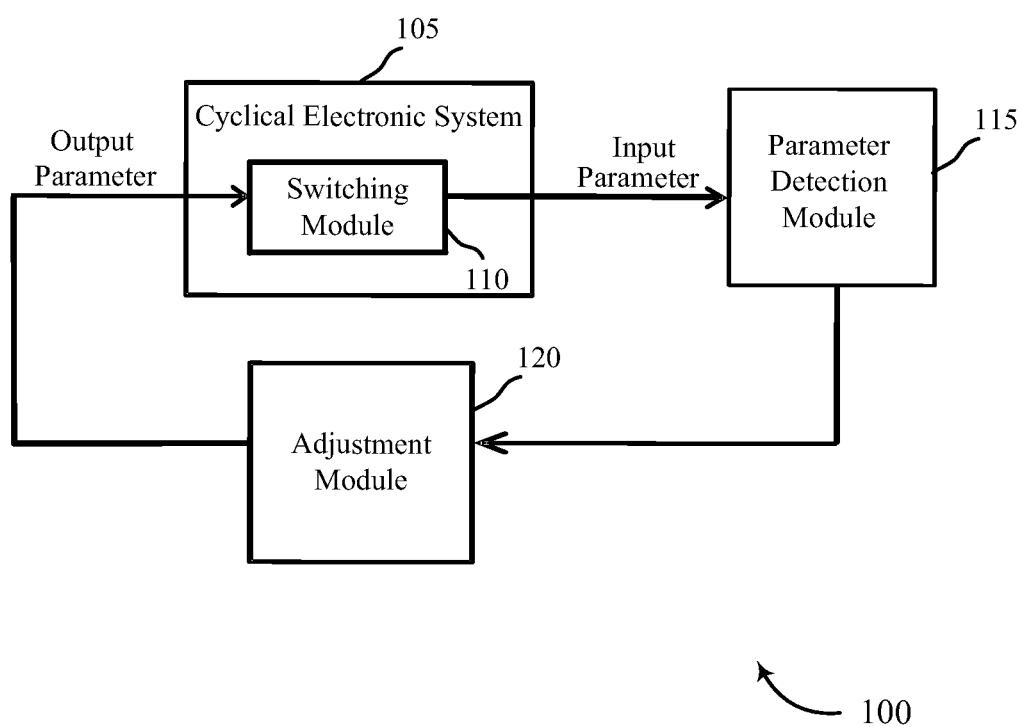
FIG. 1 illustrates a system block diagram for a cyclical electronic system with an auto-adjustment circuit.

With reference to FIG. 1, a block diagram of a system 100 of an embodiment is described. In this embodiment, a cyclical electronic system 105 includes a switching module 110. The switching module 110 may include one, or more, switch elements that are configured to switch at or near zero volts. The switching module may be, for example, a synchronous rectifier having a MOSFET that switches at or near zero volts to provide rectification of a cyclical input signal. The switching module 110, in some embodiments, couples a cyclical input signal to a ground connection when the switch is closed, and isolates the cyclical input signal from the ground connection when the switch is open. Of course, the switching module may couple the cyclical input signal to one or more of many outputs in addition to or different from a ground connection, such as a sense resistor, other electrical component, or other electrical system, to name a few examples. A parameter detection module 115 cyclically samples an input parameter at or near the time of switching of the switching module 110. The input parameter is a signal whose value is indicative of the performance of the cyclical electronic system, such as the voltage at the switching module when one or more switch elements are switched, or the energy available in the input signal when one or more switch elements are switched. The parameter detection module 115 outputs one or more signals related to the detected parameter(s), such as, for example, a signal indicating the voltage of an input signal when switching module 105 is switched, or a signal indicating sufficient energy is available to one or more switches when switching module 105 is switched.

The output of the parameter detection 115 module is provided to adjustment module 120. Adjustment module 120 receives the output of the parameter detection module 115 and may advance or delay the time within a cycle of the cyclical input signal at which the switching module 105 is switched. In each operating cycle, adjustment module 120 may adjust the operation of the switching module 110 in an attempt to adjust the input parameter of a subsequent cycle to be at, or closer to, a target value for the input parameter. The components of the system 100 may, individually or collectively, include a number of discrete analog circuits. The components of the system 100 may also, individually or collectively, be implemented in whole or in part with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., up/down counters, digital-to-analog converters) which may be programmed in any manner known in the art.

Figure 2:
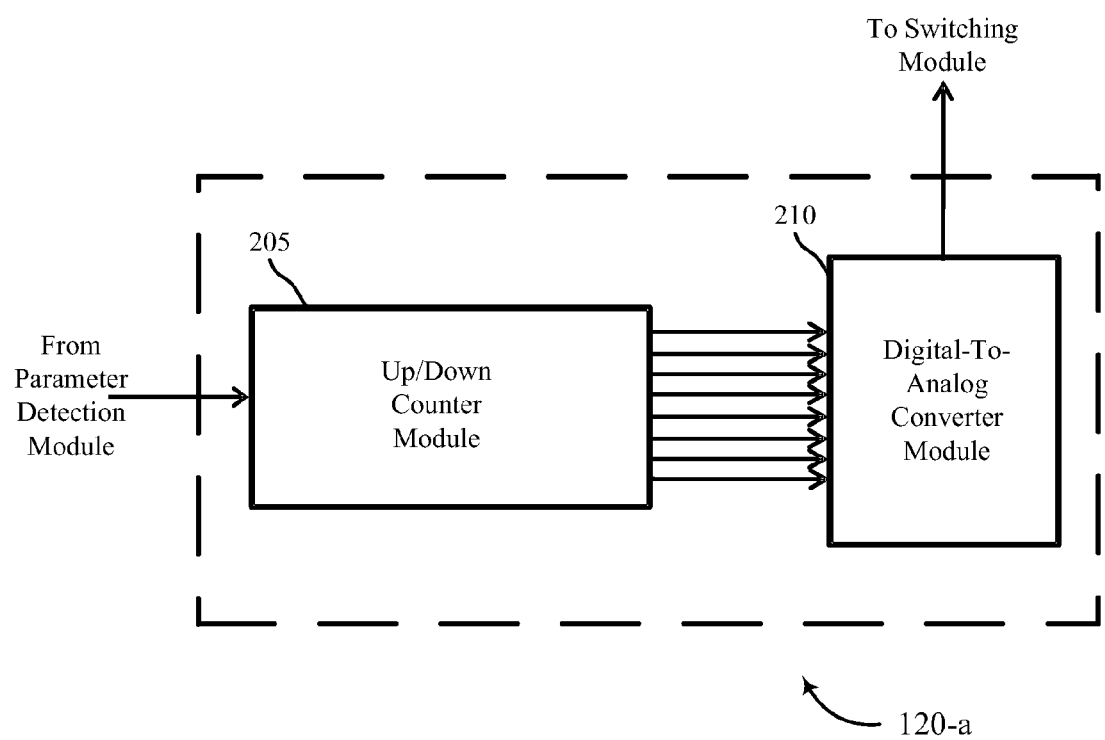
FIG. 2 illustrates an example of an adjustment module for an auto-adjustment circuit.

With reference now to FIG. 2, an adjustment module 120-$a$ of an embodiment is described. In the example of FIG. 2, an up/down counter 205 receives one or more signals from the parameter detection module, such as parameter detection module 115 of FIG. 1. Based on the signal(s) from the parameter detection module, a value output by the up/down counter module 205 may be incremented, decremented, or left unchanged. The output of the up/down counter module 205, in an embodiment, is a multi-bit digital word. In the example of FIG. 2, the output of the up/down counter module 205 is received at a digital-to-analog converter (DAC) module 210, and converted to a corresponding analog signal. This analog signal is provided to the switching module and may be used to control the switching module to enhance the performance of the cyclical electronic system. For example, the output of the DAC module 210 may be used as a threshold voltage to initiate switching of the switching module.

Figure 3:
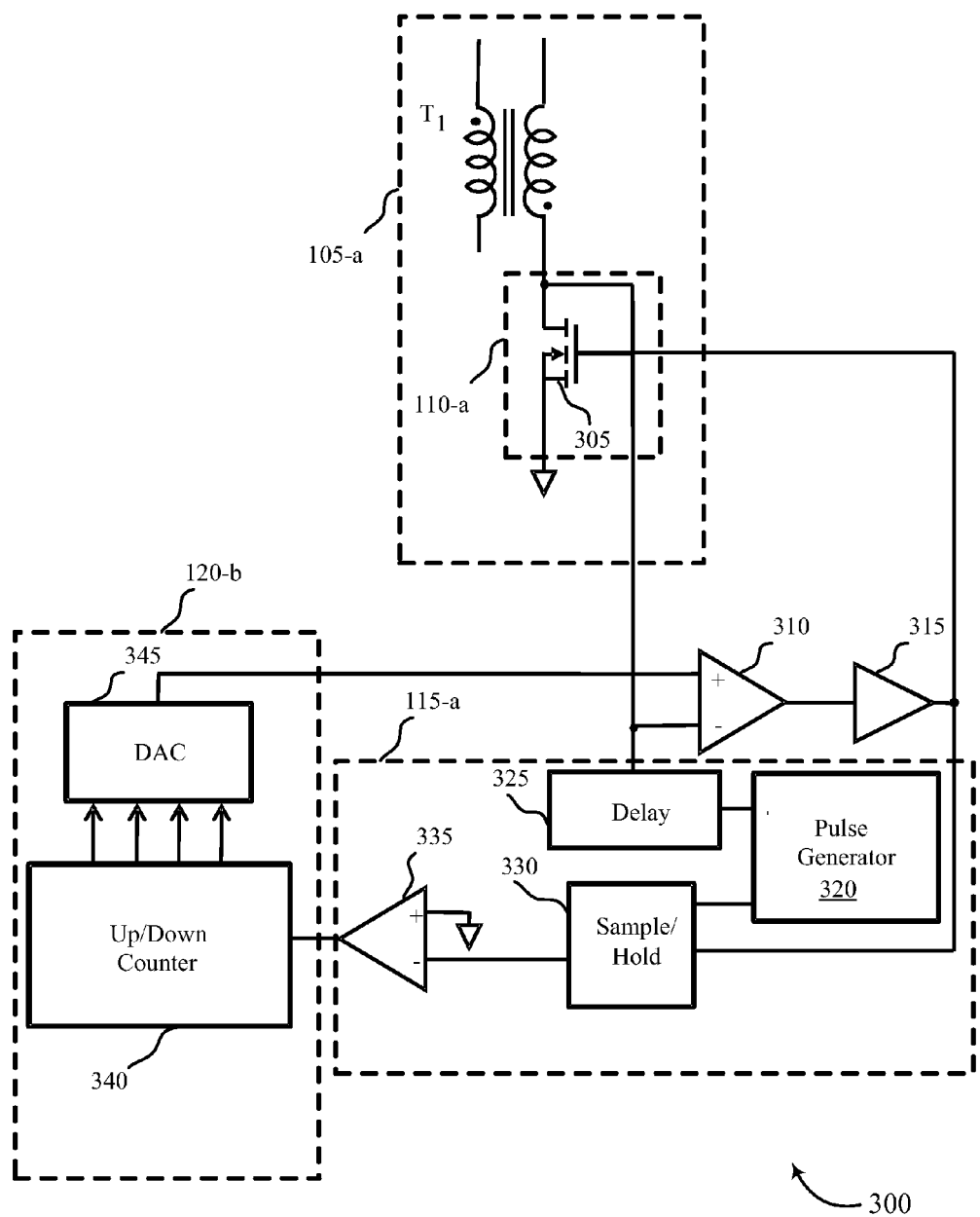
FIG. 3 illustrates an exemplary auto-adjustment circuit for a synchronous rectifier in a power converter.

Referring now to FIG. 3, an embodiment of a cyclical electronic system 300 is described that incorporates modules of FIGS. 1 and 2. In this embodiment, cyclical electronic system 105-a includes a coupled inductor and synchronous rectifier switching module 110-a. Switching module 110-a includes switch element 305, which is a MOSFET transistor, as an element in a synchronous rectifier. As is understood, synchronous rectification, also referred to as active rectification, uses active switches such as power MOSFETs to perform rectification of an incoming cyclical signal. Synchronous rectifiers are one type of system in which concepts described herein may be used. Synchronous rectification has improved efficiency of rectification as compared to rectification using traditional diodes. Synchronous rectification may be desirable in certain applications, such as in relatively low voltage converters (around 10 volts and less), in which the voltage drop of a traditional diode (typically around 0.7 to 1 volt for a silicon diode at its rated current) has an adverse effect on efficiency. For example, a buck converter power supply for a computer CPU, with a voltage output around one volt, and many amperes of output current, active rectification may be necessary. Replacing a diode with an actively controlled switching element such as a MOSFET, which typically has very low resistance when conducting, results in a reduction in power loss and a gain in efficiency as compared to a rectifier employing diodes. The timing of switching the switch elements is very important, as a short circuit across a power input needs to be avoided and can easily be caused by one transistor turning on before another has turned off.

In the embodiment of FIG. 3, the turn off timing of switch 305 is controlled by an adjustment module 120-b. When a synchronous rectifier element, such as switch 305, is activated, current flows in a negative direction, i.e., from source to drain. At the end of the on-time of a synchronous rectifier, current will decrease in magnitude and reverse direction. An ideal rectifier will turn off when the current reaches zero. Thus, zero current turn off switching of switch 305 is ideal in order to achieve most efficient rectification. In this embodiment, an on-voltage detector 310 senses voltage at the switch 305 drain. When the drain voltage rises (becomes more positive) to the threshold level an input of the detector 310, a turn-off transition for switch 305 is initiated through driver 315, which is coupled to the gate of switch 305. The threshold voltage for the detector 310 is set by adjustment module 120-b. Adjustment module 120-b of this embodiment receives a signal from parameter detection module 115-a. In this embodiment, parameter detection module 115-a includes a pulse generator 320, a delay circuit 325, a sample and hold circuit 330, and a comparator 335. Adjustment module 120-b of this embodiment includes an up/down counter 340, and a DAC 345.

Parameter detection module 115-a determines if a voltage is present at the drain of switch 305. When switch 305 turns off, a brief delay timer is set at delay circuit 325, and the switch 305 channel resistance becomes relatively high. After the brief delay when switch 305 is initially off, the drain voltage of switch 305 is sampled by sample and hold circuit 330. Pulse generator 320 generates a pulse when a signal indicating the end of the delay at delay circuit 325 is received. If the switch 305 drain voltage is negative at the sampling instant, then switch 305 had been turned off too soon. Similarly, if the switch 305 drain voltage is positive at the sampling instant, then switch 305 had been turned off too late. Ideally switch 305 is turned off at the instant that the switch 305 drain current is zero. If the switch 305 drain current is negative, indicating a current flow from source to drain, then the switch 305 drain voltage will become more negative at the turn off transition time. A negative voltage at the sample and hold 330 will cause the output of the comparator 335, which is the output of the parameter detection module 115-a, to be positive and the up/down counter 340 will be incremented. The signal output by the DAC 345 will be increased, thereby raising the threshold voltage at which the switch 305 will be switched. On the next cycle the turn off instant should occur at a current that is either less negative or positive as a result of the change in the output of the adjustment module 120-b.

If the output of the sample and hold circuit 330 is positive, indicating that the current flow in switch 305 is from drain to source, then switch 305 has been turned off too late and the output of parameter detection module 115-a will be negative causing the up/down counter 340 to be decremented, thereby causing reduction in the threshold voltage at which the switch 305 will be switched. On the subsequent cycle the turn-off instant should occur at a current that is less positive or negative. The auto-adjustment circuit in FIG. 3 thus causes the current threshold for the turn off of switch 305 to be as close to zero as possible. Ideally the turn off transition will occur at precisely zero drain current. If the switch 305 turn-off transition occurs when the drain current is still negative then the body diode of switch 305 becomes forward biased and the body diode forward voltage and current form a power loss equal to the product of body diode forward voltage and switch 305 current. If the drain current is positive, i.e., from drain to source then there is reverse power flow from the converter output, which is lost power equal to the product of output voltage and switch 305 current. In another embodiment, switch 305 drain voltage trajectory may be sensed at a parameter detection module 115, in order to set the turn off threshold voltage that is output from adjustment module 120-b.

In some situations, zero voltage switching circuits may rely on reversal of magnetizing current in an inductor, also referred to as a magnetic element, prior to the turn on of a main switch, in order to provide for the availability of energy needed to drive the drain voltage of the main switch to zero volts. The reversal of magnetizing current in a main magnetic element may be accomplished by the use of a synchronous rectifier instead of a rectifier diode. For some circuits the use of a synchronous rectifier may be problematic because the rectifier is a high side switch, or separated by an isolation boundary, from the control circuits. In these situations it would be beneficial to achieve the reversal of magnetizing current using an active switch with a reference voltage at the same reference voltage of the other control circuits. Aspects of the present disclosure may be incorporated into such zero voltage switching circuits to adjust the timing of switching within a cycle to achieve switching at or near zero volts while also having sufficient energy from the reversal of magnetizing current in a main magnetic element in order to provide for the availability of energy needed to drive the drain voltage of the main switch to zero volts. Near zero voltage switching results in reduced, or no, recirculated energy being introduced into the circuit as a result of switching when a magnitude of the voltage at the switch is substantially more than zero volts. Switching at minimum recirculated energy while maintaining sufficient energy to drive switching elements to zero volts is provided by various aspects of this disclosure. For example, in a boost converter it may be preferred that a conventional rectifier be used as the boost rectifier as a high side switch, and the magnetizing current be accomplished using an active switch (i.e., a switching module as described above) referred to the source of the main boost switch. Furthermore, in an isolated flyback converter, or an isolated coupled inductor boost converter, there is an isolation barrier between the timing circuits and secondary rectifier(s). For purposes of simplified control it may be preferable to use diode rectifiers in the secondary and accomplish magnetizing current reversal with a switch in the primary having a common reference with the main switch and primary control and timing circuits.

Figure 4:
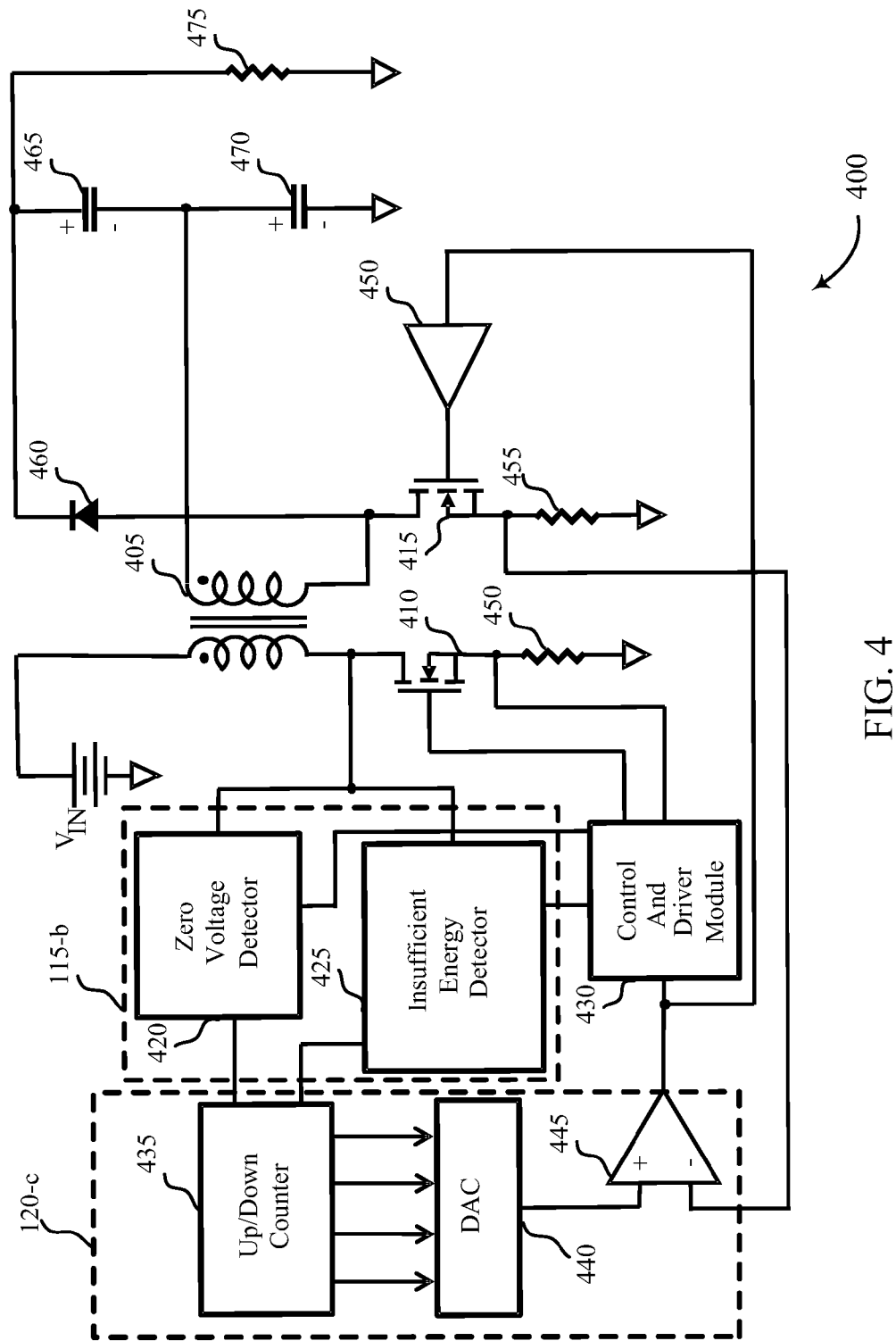
FIG. 4 illustrates an exemplary auto-adjustment circuit for a synchronous rectifier that relies on reversal of magnetizing current in a main magnetic circuit element for energy to drive the drain voltage of a main switch to zero volts.

FIG. 4 illustrates an embodiment in which an auto-adjustment circuit is used in a zero voltage switching critical conduction mode converter 400. The converter 400 uses a coupled inductor 405 to create energy for zero voltage switching. By allowing the magnetizing current in the coupled inductor 405 to reverse each cycle by a small amount, the coupled inductor 405 will store energy that can be used to drive the drain voltage of switch 410 to zero volts when the synchronous rectifier switch 415 is turned off. The optimal threshold current for turning off switch 415 is a current that provides enough energy to drive the drain of switch 410 to zero volts. Larger currents will result in higher conduction losses in the entire power circuit. Smaller currents will not produce sufficient energy to drive the drain voltage of switch 405 to zero volts. To accomplish efficient operation of switches 410 and 415, parameter detection module 115-b and adjustment module 120-c adjust the timing of the turn-on of switch 410.

The parameter detection module 115-b of this embodiment includes a zero voltage detector 420, and an insufficient energy detector 425. The zero voltage detector 420 causes the initiation of a turn on transition for switch 410 when the drain voltage of the switch 410 reaches zero volts. The turn on transition is initiated through control and driver module 430. Insufficient energy detector 425 tracks the drain voltage of switch 410, and initiates a turn on transition for switch 410 when the drain reaches a positive minimum voltage and then begins to rise up. The turn on transition is initiated through control and driver module 430, which is coupled with the zero voltage detector 420 and the insufficient energy detector 425. The insufficient energy detector 425 attempts to keep turn-on transition losses for switch 410 to a minimum by initiating the turn on transition when the switch 410 drain voltage is at its minimum voltage. If there is insufficient energy to drive the drain of switch 410 to zero volts, then the energy available will cause the switch 410 drain voltage to fall to some minimum voltage after which the drain voltage will rise. If the drain voltage is above a minimum voltage threshold, this indicates that the input signal did not have sufficient energy to overcome the electrical characteristics of the switch, such as inherent capacitances of the switch, and thus the voltage at the switch input did not drop to a level that is desirable for a particular application.

The adjustment module 120-c of this embodiment includes an up/down counter 435, a DAC 440, and a comparator 445. The up/down counter 435 is decremented when the turn on transition for switch 410 is initiated by the zero voltage detector 420. The up/down counter 435 is incremented when the turn on transition for switch 410 is initiated by the insufficient energy detector 425. In one embodiment, the up/down counter 435 is asymmetric, and is incremented at a higher rate than it is decremented. In such a manner, insufficient energy is more rapidly compensated than switching at less than zero voltage. The counter 435 output is converted to an analog threshold voltage by the DAC 440. The DAC 440 output is provided to comparator 445. Sense resistors 450 and 455 are connected between ground and switches 410 and 415, respectively. When the voltage at the sense resistor 455 reaches the threshold voltage of the comparator 445 the output of the comparator 445 changes state initiating a turn off transition for the switch 415 and a turn on transition for the main switch 410. A standard diode 460 is connected between switch 415 and output capacitors 465 and 470, and output load resistor 475.

Figure 5:
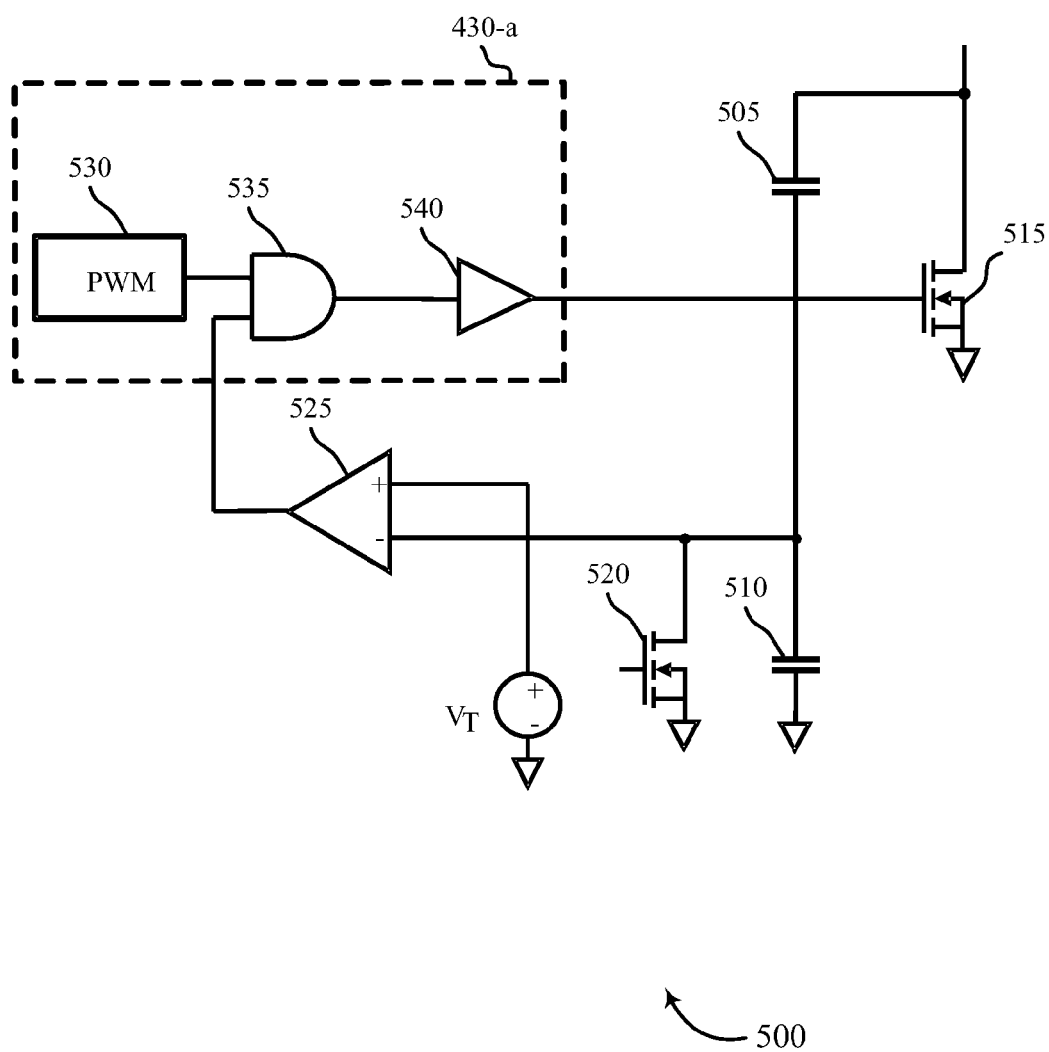
FIG. 5 illustrates an exemplary drain voltage sensing and energy detection circuit.

FIG. 5 illustrates an exemplary circuit that may be used in parameter detection module 115 as either a zero voltage detector or insufficient energy detector. In this embodiment, a substantially lossless drain voltage sensing circuit 500 utilizes capacitors 505 and 510 to form a capacitive voltage divider. When the main switch 515 is on, the auxiliary switch 520 is also on and the capacitor 510 voltage and switch 520 drain voltage are zero. DC errors may be introduced over time into the capacitive voltage divider due to small bias currents at the input to the comparator 525 that would charge or discharge capacitor 510, but these errors are eliminated each switching cycle by shorting the capacitor 510 using switch 520 when the main switch 515 voltage is zero. The capacitive voltage divider can be used for detecting a near zero voltage at the drain of main switch 515. In a similar manner, the capacitive voltage divider can be used for detecting insufficient energy to drive the drain of main switch 515 to zero volts after a transition. In each case, the drain voltage may be detected to determine a near zero drain voltage condition, with drain voltage provided to comparator 525 to initiate a gate turn-on transition through, for example, control and driver module 430-a. In this embodiment, control and driver module 430-a includes a pulse width modulator (PWM) 530, an AND gate 535, and a driver 540, such that an indication of voltage in excess of $V_T$ at comparator 525 will be logically ANDed with PWM 530 output to initiate a gate turn-on transition.

Figure 6:
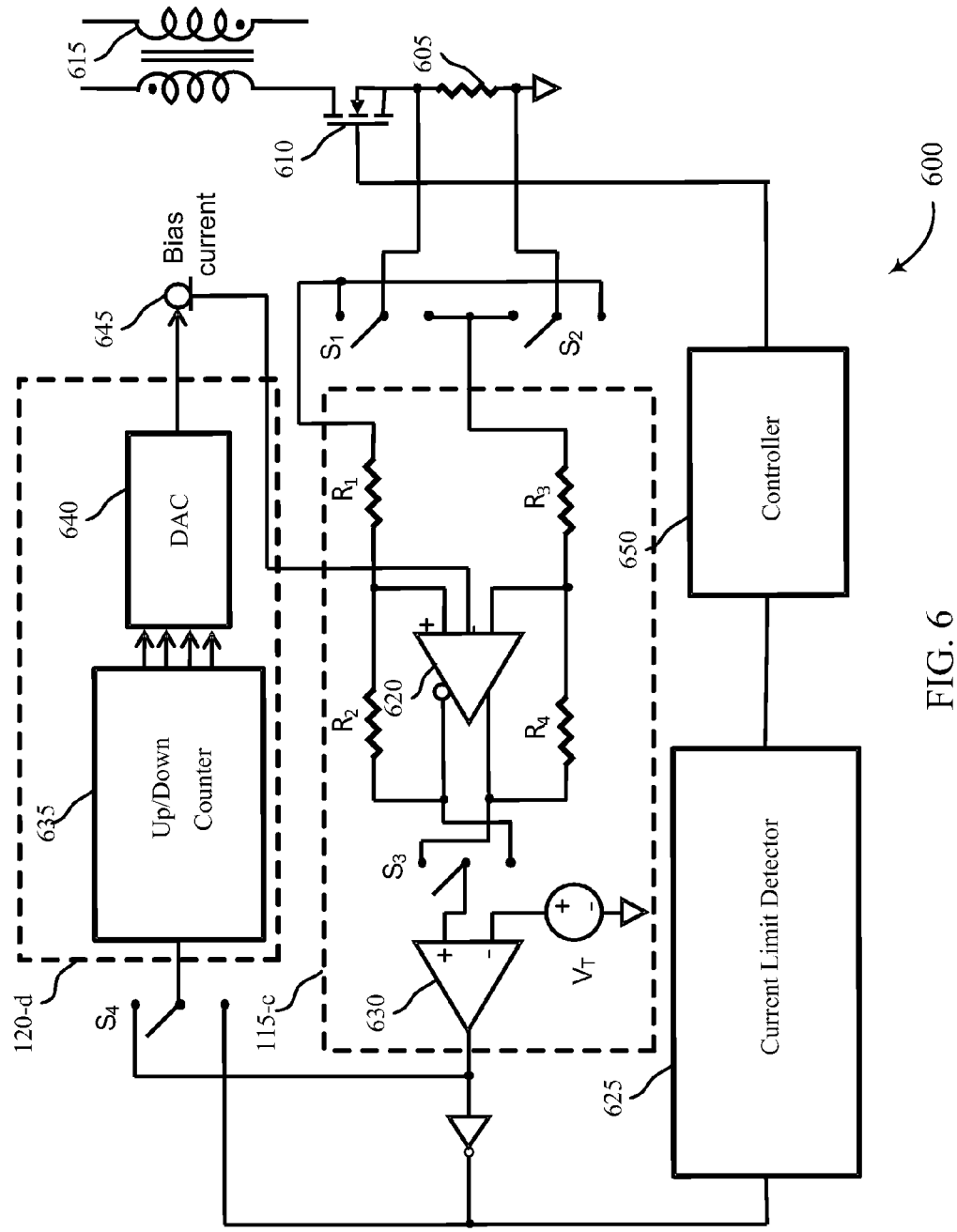
FIG. 6 illustrates an exemplary auto-adjustment circuit in a high gain amplifier used for sensing current in a main switch of a power converter.

FIG. 6 illustrates a system 600 of another embodiment, in which a parameter detection module 115-c and adjustment module 120-d may be used. In this embodiment, adjustment module 120-d is used to improve the DC offset performance of a high gain amplifier used for amplifying the voltage of a current sense resistor 605 that senses current in a main switch 610 of a power converter coupled through a magnetic element 615. It is often desirable to sense current with a very small value sense resistor since sense resistor power losses are directly proportional to sense resistor value. The smallest value sense resistor will have the lowest power losses, but it will also have the lowest resistor voltage. Small resistor voltages can be amplified by a high gain amplifier to increase the sensed voltage to a more useful level, but amplifier errors can compromise the accuracy of the sensed current. In FIG. 6 amplifier 620 is an operational amplifier with complementary outputs. Switch $S_1$ applies the current sense resistor 605 voltage to either the inverting or non-inverting input of amplifier 620, depending on the $S_1$ switch position. Switch $S_2$ applies ground to either the non-inverting or the inverting input of amplifier 620, depending on the $S_2$ switch position. The $S_1$ and $S_2$ switches effectively reverse the applied voltage at the input to amplifier 620. Switch $S_3$ selects either the normal or complementary output of amplifier 620. The $S_3$ switch position selects the output that provides the non-inverted and amplified current sense resistor 605 voltage. The effect of the DC offset is to create an error at the normal output and an error of the opposite sign but equal magnitude at the complementary output of amplifier 620. When the main switch 610 is on $S_1$, $S_2$, and $S_3$ are all in their upper positions so that the current sense resistor 605 voltage is applied at the non-inverting input of amplifier 620, ground is applied at the inverting input of amplifier 620, and the normal output of amplifier 620 is applied at the current limit detector 625. On alternate switching cycles while the main switch 610 is off the $S_1$, $S_2$, and $S_3$ switches are placed in their lower positions. When the main switch 610 is off the current in the current sense resistor 605 and the current sense resistor 605 voltage are zero. The outputs of amplifier 620 are then the amplified DC offset voltages. If amplifier 620 is a ground referenced amplifier, only one of the outputs of amplifier 620 will have a positive value. Comparator 630 may have a very small threshold voltage set at its inverting input. Comparator 630 thus senses the existence of a DC offset error when the main switch 610 is off. There will only be a measurable DC offset voltage for one of the switch positions. Whenever the output of comparator 630 is high during an off state of switch 610, the up/down counter 635 of adjustment module 115-$d$ is either incremented or decremented depending on the positions of the switch $S_4$. In one embodiment, the switches $S_1$, $S_2$, $S_3$, and $S_4$ are simultaneously either in the up or down position. The output of the up/down counter 635 is applied to a DAC 640 whose output sets a bias current 645 that affects the DC output voltage. The counter 635 counts up or counts down until the DC offset error is reduced to a negligible value. Controller 650 controls the switching of switch 610 based on the output of the current limit detector 625, based on the value of the sensed current in the current sense resistor 605.

Figure 7:
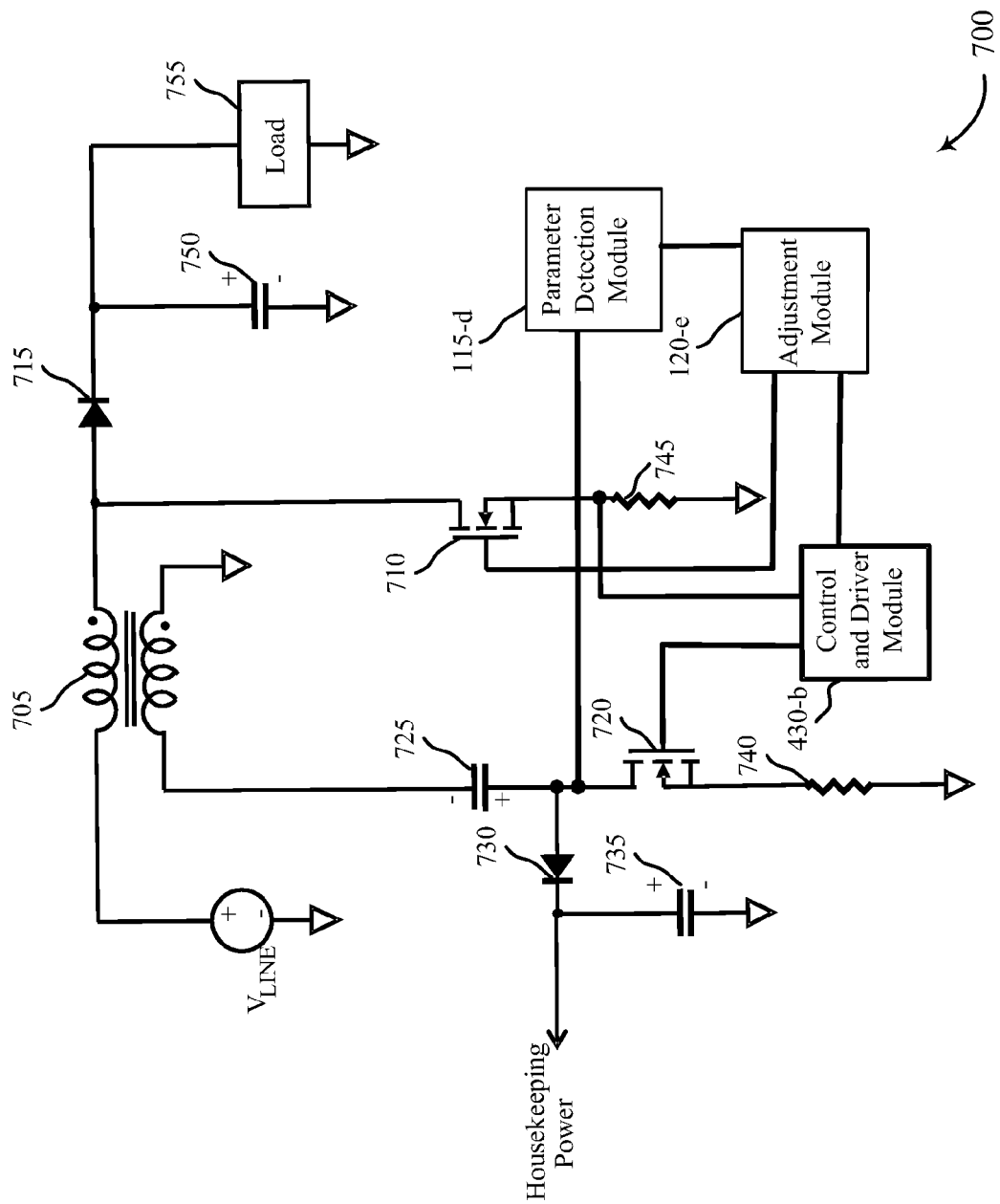
FIG. 7 illustrates an exemplary auto-adjustment circuit in a boost converter.

With reference now to FIG. 7 an illustration of a zero voltage switching critical conduction mode boost converter 700 is described, in which parameter detection module 115-$d$ and adjustment module 120-$e$ may be utilized to enhance switching of the converter. In this converter the magnetizing current in a boost inductor 705 must be reversed during the off time of the main switch 710 so that there will be magnetizing energy stored in the boost inductor 705 that may be used to drive the drain voltage of the main switch 710 to zero volts. The boost converter 700 includes a conventional diode 715 rectifier, and not a synchronous rectifier, and therefore the reverse magnetizing current in boost inductor 705 cannot be conducted in diode 715. The reverse magnetizing current, in this embodiment, may be conducted in switch 720 after diode 715 has turned off. Switch 720 can conduct during the off time of switch 710 to charge capacitor 725. Capacitor 725 discharges while diode 715 and switch 710 are off. Capacitor 725 also discharges while switch 710 is on. Switch 720 and capacitor 725 along with the secondary winding, also referred to as housekeeping winding, of boost inductor 705 obviate the need for a high side synchronous rectifier for creating reverse magnetizing current in boost inductor 705. In many boost converters the housekeeping winding will already exist, so all that is needed is to use a synchronous rectifier for one of the housekeeping rectifiers. Switching of the main switch 710 and switch 720 may be accomplished using a parameter detection module 115-$d$, adjustment module 120-$e$, and control and driver module 430-$b$, which may be configured similarly as in embodiments described above. Switches 710 and 720 of this embodiment are coupled to ground through resistors 740 and 745, respectively. Output capacitor 750 and load 755 are coupled to diode 715.

Figure 8:
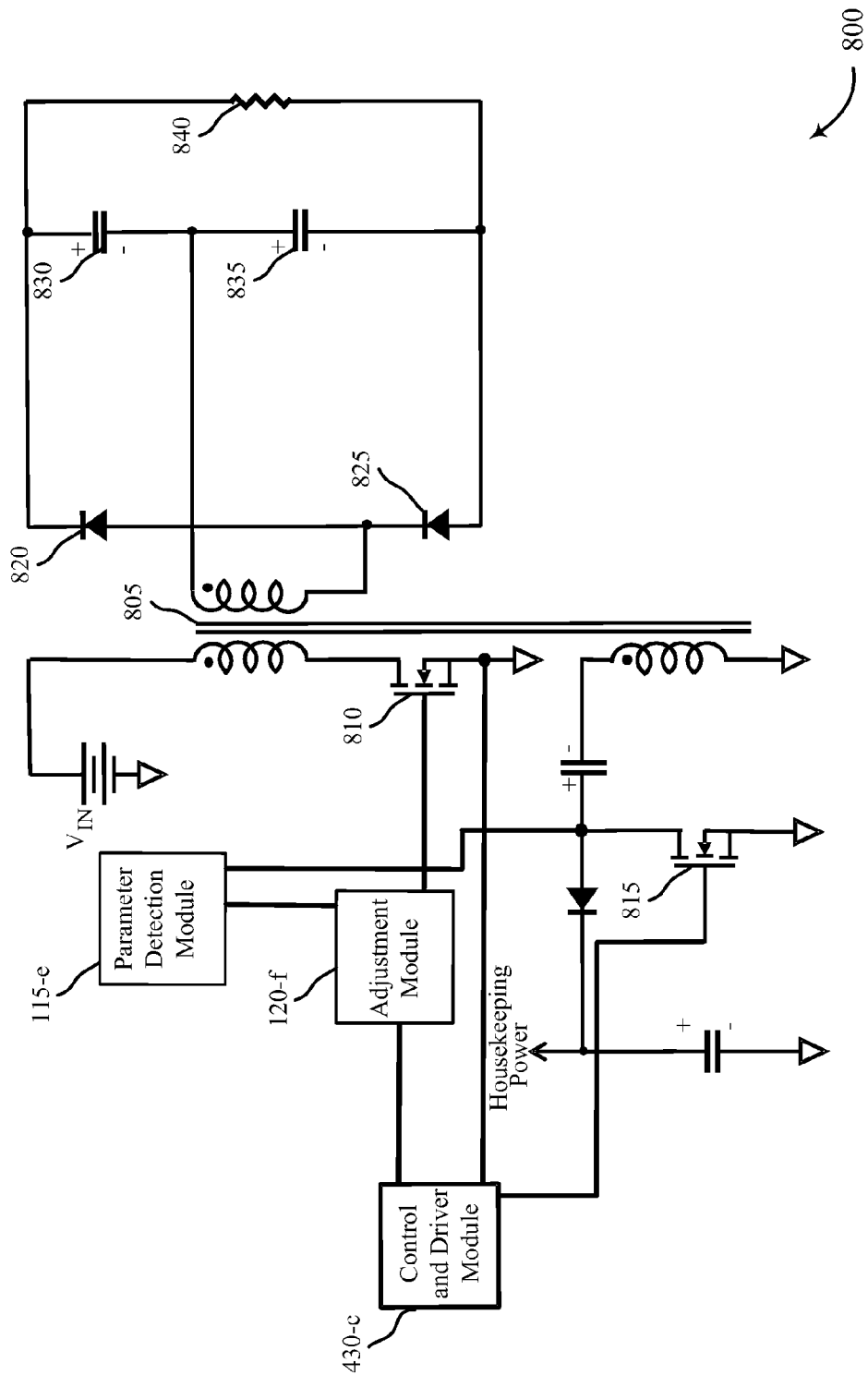
FIG. 8 illustrates an exemplary auto-adjustment circuit in another boost converter.

FIG. 8 illustrates a boost converter of another embodiment, in which parameter detection module 115-$e$ and adjustment module 120-$f$ may be utilized to enhance switching of the converter. The circuit illustrated in FIG. 8 provides an isolated coupled inductor boost converter 800. The circuit of FIG. 8 is also a zero voltage switching critical conduction mode design. The reversal of magnetizing current in the coupled boost inductor 805 may be used to provide the energy needed to drive the drain voltage of the main switch 810 to zero volts. The mechanism for the magnetizing current reversal may be the same as the mechanism for current reversal that was described above for the FIG. 7 circuit. The switch 815 provides the magnetizing current reversal when both the switch 810 is off and both of the secondary diodes 820 and 825 are off. One advantage of using the switch 810 in this embodiment is that a secondary synchronous rectifier and isolated driver are not needed in such a circuit. All of the control for the boost converter 800 is in the primary circuit. Similarly as described above, switching of the main switch 810 and switch 815 may be accomplished using a parameter detection module 115-$e$, adjustment module 120-$f$, and control and driver module 430-$c$, which may be configured similarly as in embodiments described above. Output capacitors 830 and 835 and load resistor 840 provide output of the boost converter 800.

Figure 9:
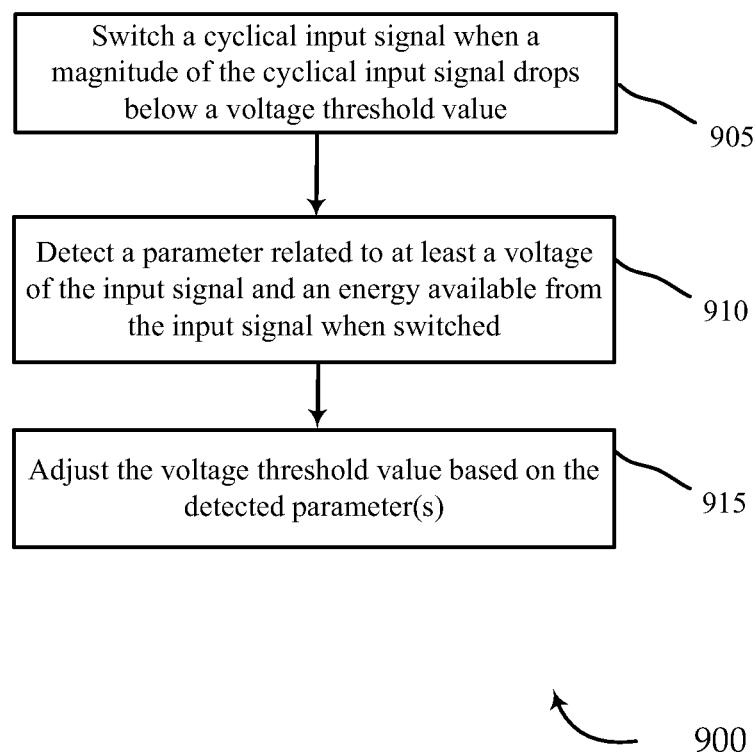
FIG. 9 is a flow chart diagram illustrating the operational steps for adjusting switching in a zero voltage switching module of a cyclical electronic system according to various embodiments.

FIG. 9 illustrates a flow chart 900 of the operational steps for adjusting switching in a zero voltage switching module of a cyclical electronic system according to various embodiments. The steps of flow chart 900 may be performed by a system as described in any of FIGS. 1-8. Initially, at block 905, a cyclical input signal is switched when a magnitude of the cyclical input signal drops below a voltage threshold value. Switching when the cyclical input signal drops below the voltage threshold value results in the switching occurring when the voltage of the input signal is, ideally, at or near zero volts. At block 910, a parameter is detected related to at least a voltage of the input signal and an energy available from the input signal when switched. If the voltage has a magnitude greater than zero, for example, a parameter may be the detected voltage value or a magnitude of the detected voltage. If the switch is actuated and the voltage at the switch is at a relatively high value, this may indicate that there was not sufficient energy available in the input signal to result in relatively fast decrease to a voltage that is below a set threshold value. Such a situation may result in an insufficient energy value parameter. At block 915, the voltage threshold value at which the switch is switched is adjusted based on the detected parameter(s). For example, if the parameter indicates that switching occurred when the voltage at the switch input was relatively high, the threshold value may be decreased to result in switching at a point closer to zero volts. Likewise, if the parameter indicates that there was not sufficient energy to drive the switch input voltage to below a threshold value, the threshold value may be increased to result in switching at a somewhat higher voltage value in order to have sufficient energy in the input signal to drive the switch input to below the set threshold voltage. In such a manner, operation of the switch may be balanced between providing switching at substantially zero volts, while also providing sufficient energy when the switch is switched to drive the voltage at the switch input to a desired voltage level. In one embodiment, a parameter that indicates insufficient energy is weighted to have a relatively larger impact on the adjusted threshold voltage value than a signal indicating that the switch was switched at a non-zero voltage.

Figure 10:
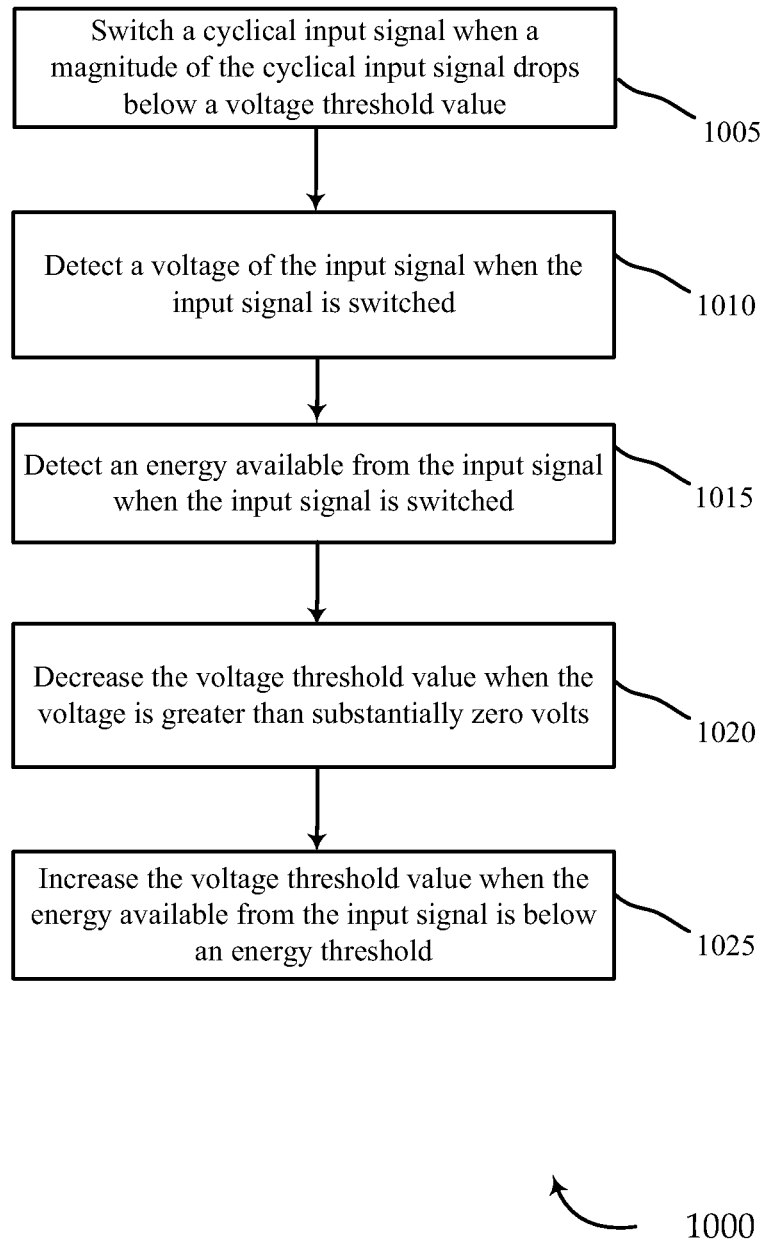
FIG. 10 is a flow chart diagram illustrating the operational steps for adjusting switching in a zero voltage switching module of a cyclical electronic system according to various embodiments.

With reference now to FIG. 10 is a flow chart diagram 1000 illustrating the operational steps for adjusting switching in a zero voltage switching module of a cyclical electronic system according to various embodiments is described. The steps of flow chart 1000 may be performed by a system as described in any of FIGS. 1-8. Similarly as described with respect to FIG. 9, a cyclical input signal is switched when a magnitude of the cyclical input signal drops below a voltage threshold value, as indicated at block 1005. At block 1010, a voltage is detected for the input signal when the input signal is switched. The detected voltage may be a value of the voltage at the input to the switch, a magnitude of the voltage at the input of the switch, or may be a voltage relative to a certain threshold. At block 1015, the energy available from the input signal is detected when the input signal is switched. The detected energy available may be an indication that sufficient energy was available to drive the voltage at the input of the switch to a voltage below a certain threshold, or may be in indication that insufficient energy was available to drive the input of the switch below a voltage threshold. The voltage threshold value is decreased when the detected voltage is greater than substantially zero volts, according to block 1020. The voltage threshold value is increased when the energy available from the input signal is below an energy threshold, as noted at block 1025. Energy that is below a threshold may be determined, for example, based on a voltage at the switch input after the switch is turned on. A switch voltage that does not fall below a minimum threshold may indicate that the input signal did not have sufficient energy to overcome the electrical characteristics of the switch and thus the voltage at the switch input did not drop to below a level that is desirable for a particular application.

In some embodiments, the voltage threshold value is increased and decreased through incrementing and decrementing of a counter. In cases where the switching voltage is sufficiently close to zero volts, and the input signal had sufficient energy to drive the input of the switch below a voltage threshold, the value of the counter is left unchanged. The counter value may be provided to a digital to analog converter and converted to an analog value that represents the voltage threshold value. In such a manner, operation of the switch may be balanced between providing switching at substantially zero volts, while also providing sufficient energy when the switch is switched to drive the voltage at the switch input to a desired voltage level. In one embodiment, a parameter that indicates insufficient energy is weighted to have a relatively larger impact on the adjusted threshold voltage value than a signal indicating that the switch was switched at a non-zero voltage.

Thus, according to various embodiments, by combining an up/down counter with a parameter sensing circuit and a parameter generating circuit, auto-adjustment of a cyclical electronic system may be accomplished. The addition of a synchronous rectifier in a housekeeping power supply may provide a mechanism for magnetizing current reversal. By reversing the current in the housekeeping winding instead of the main winding of an inductor or coupled inductor, the main power stage rectifiers may be rectifier diodes instead of synchronous rectifiers.

While the above description contains many specificities, these should not be construed as limitations on the scope of the invention, but rather, as exemplifications or embodiments thereof. Many other variations are possible. For example, there are a wide variety of circuits that may benefit from the general approach to auto-adjustment as described herein. The technique for magnetizing current reversal in a boost or coupled inductor boost may also be applied to other circuit topologies that may employ zero voltage switching critical conduction mode control. Circuits similar to the circuits shown but with polarity of the input or output reversed from that illustrated in the figures, of course, shall be considered embodiments of this disclosure. Circuits similar to those shown, but having coupled magnetic circuit elements with more than two windings and circuits with more than one output also shall be considered embodiments of this disclosure. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of this disclosure. Also, some of the embodiments illustrated show N channel MOSFET switches, but the operation revealed and the benefits achieved may also be realized in circuits that implement the switches using P channel MOSFETs, IGBTs, JFETs, bipolar transistors, junction rectifiers, or schottky rectifiers.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An auto-adjustment circuit for a cyclical electronic system, comprising:
   a switching module configured to couple a cyclical input signal to a first output;
   a parameter detection module coupled with the switching module, and configured to detect a parameter related to at least a voltage of the cyclical input signal and an energy available in the cyclical input signal, wherein the parameter detection module comprises a voltage detector and an energy detector each coupled with the input of the switching module;
   an adjustment module coupled with the parameter detection module and switching module, and configured to control the switching of the switching module based on the detected parameter, wherein the adjustment module comprises:
   a counter coupled with the voltage detector and the energy detector, the output of the counter decremented when the voltage detector output indicates the magnitude of the input signal voltage is at or above a level to achieve substantially zero volts in a switching transition, and the output of the counter incremented when the energy detector output indicates that energy available for switching the switching module drops below an energy threshold; and
   a comparator coupled with the counter and configured to output a signal to control the switching of the switching module based on the output of the counter and a threshold level,
   wherein the adjustment module controls the switching of the switching module to achieve minimum recirculated energy while maintaining sufficient energy to drive switching elements within the switching module to zero volts.

2. The auto-adjustment circuit of claim 1, wherein the adjustment module further comprises:
   a digital-to-analog converter (DAC) coupled between the counter and the comparator, the DAC configured to receive the counter output, convert the counter output to an analog signal having a voltage level that corresponds to the counter output, and output the analog signal to the comparator.

3. The auto-adjustment circuit of claim 1, wherein the counter is incremented and decremented at different rates, the rate of incrementing the counter being higher than the rate of decrementing the counter.

4. The auto-adjustment circuit of claim 1, wherein the output of the counter is maintained at an existing level when the voltage detector output indicates the magnitude of the cyclical input signal voltage is below a threshold voltage when the switching module is switched to connect the input signal to the first output, and the energy detector output indicates that energy available for switching the switching module is at or above the energy threshold.

5. A method for adjusting switching in a zero voltage switching module of a cyclical electronic system, comprising:
   switching a cyclical input signal to a first output when a magnitude of the voltage of the cyclical input signal drops below a voltage threshold value;
   detecting a parameter related to at least a voltage of the input signal and an energy available from the input signal when the input signal is switched to the first output, wherein detecting the parameter comprises:
   detecting a voltage of the input signal, and
   detecting an energy available from the input signal; and
   adjusting the voltage threshold value based on the detected parameter, wherein adjusting the voltage threshold value comprises:
   decreasing the voltage threshold value when the voltage is less than substantially zero volts; and
   increasing the voltage threshold value when the energy available from the input signal is below an energy threshold.

6. The method of claim 5, wherein the energy threshold is set to a value to provide sufficient energy to drive a transistor of a switching circuit to zero volts when the cyclical input signal is switched to the first output.

7. A method for adjusting switching in a zero voltage switching module of a cyclical electronic system, comprising:
   switching a cyclical input signal away to a first output when a magnitude of the voltage of the cyclical input signal drops below a voltage threshold value;
   detecting a parameter related to at least a voltage of the input signal and an energy available from the input signal when the input signal is switched to the first output; and
   adjusting the voltage threshold value based on the detected parameter,
   wherein adjusting the voltage threshold value comprises:
   receiving a voltage of the input signal when the input signal is switched to the first output;
   decrementing a counter when the received voltage is less than zero volts;
   receiving an indication of available energy from the input signal when the input signal is switched to the first output;
   incrementing the counter when the available energy is below an energy threshold; and
   setting the voltage threshold value based on a current value of the counter.

8. The method of claim 7, wherein setting the voltage threshold value comprises:
   providing the current value of the counter to a digital-to-analog converter; and
   converting the counter output to the voltage threshold value.

9. The method of claim 7, wherein the counter is incremented and decremented at different rates, the rate of incrementing the counter being higher than the rate of decrementing the counter.

10. The method of claim 7, further comprising:
    maintaining the current value of the counter when the received voltage is substantially zero volts and the available energy is at or above the energy threshold.

11. An apparatus for adjusting switching in a zero voltage switching module of a cyclical electronic system, comprising:
    means for switching a cyclical input signal to a first output when a magnitude of the cyclical input signal drops below a voltage threshold value;
    means for detecting a parameter related to at least a voltage of the input signal and an energy available from the input signal when the input signal is switched to the first output; and
    means for adjusting the voltage threshold value based on the detected parameter, wherein the means for adjusting the voltage threshold value comprises:
    means for decreasing the voltage threshold value when the voltage is less than substantially zero volts; and means for increasing the voltage threshold value when the energy available from the input signal is below an energy threshold.

12. The apparatus of claim 11, wherein the means for detecting a parameter comprises:
   means for detecting a voltage of the input signal; and
   means for detecting an energy available from the input signal.

13. The method of claim 11, wherein the energy threshold is set to a value to provide sufficient energy to drive a transistor of a switching circuit to zero volts when the cyclical input signal is switched to the first output.

* * * * *